(12) United States Patent
Winkler et al.

(10) Patent No.: US 9,381,900 B2
(45) Date of Patent: Jul. 5, 2016

(54) ELECTRIC BRAKE BOOSTER WITH TRANSMISSION CLEARANCE COMPENSATION

(71) Applicant: Robert Bosch GmbH, Stuttgart (DE)

(72) Inventors: Roman Winkler, Asnieres sur Seine (FR); Philippe Richard, Chelles (FR); Bastien Cagnac, Cramoisy (FR); Francois Gaffe, La Turballe (FR); Jean-Marc Ritt, Strasbourg (FR)

(73) Assignee: Robert Bosch GmbH, Stuttgart, DE (US)

( * ) Notice: Subject to any disclaimer, the term of this patent is extended or adjusted under 35 U.S.C. 154(b) by 15 days.

(21) Appl. No.: 14/411,273

(22) PCT Filed: Jun. 19, 2013

(86) PCT No.: PCT/EP2013/062687
§ 371 (c)(1),
(2) Date: Dec. 24, 2014

(87) PCT Pub. No.: WO2014/001162
PCT Pub. Date: Jan. 3, 2014

(65) Prior Publication Data
US 2015/0197231 A1    Jul. 16, 2015

(30) Foreign Application Priority Data

Jun. 25, 2012  (FR) ...................... 12 56008

(51) Int. Cl.
| | | |
|---|---|---|
| *B60T 13/74* | (2006.01) |
| *F16D 65/18* | (2006.01) |
| *F16D 121/24* | (2012.01) |
| *F16D 125/42* | (2012.01) |
| *F16D 125/48* | (2012.01) |
| *F16D 125/52* | (2012.01) |

(52) U.S. Cl.
CPC ............. *B60T 13/745* (2013.01); *B60T 13/741* (2013.01); *F16D 65/18* (2013.01); *F16D 2121/24* (2013.01); *F16D 2125/42* (2013.01); *F16D 2125/48* (2013.01); *F16D 2125/52* (2013.01)

(58) Field of Classification Search
CPC ......... F16H 1/16; F16H 1/225; F16H 57/039; F16H 55/22; F16H 19/04; H02K 7/081; F16D 65/14; F16D 65/16; F16D 65/18; F16D 2121/24; F16D 2125/40; F16D 2125/52; F16D 2125/24; B60T 13/74; B60T 13/741; B60T 13/746; B60T 13/665; B60T 13/586; B60T 13/686; B60T 13/745; B60T 8/00; B60T 7/042; B60H 1/00857; F16K 31/043; F16K 31/045; F16K 31/535; B60L 7/24; F15B 15/065; F15B 7/005; F01B 9/047
USPC ...... 188/162, 196 V, 79.63; 74/606 R, 665 R, 74/724, 89, 89.14, 425; 60/545; 92/136; 303/3
See application file for complete search history.

(56) References Cited

U.S. PATENT DOCUMENTS

| | | | | |
|---|---|---|---|---|
| 5,570,606 | A * | 11/1996 | Irie ........................ | F16H 1/203 74/425 |
| 7,144,126 | B2 * | 12/2006 | Ro ......................... | B60R 1/072 248/476 |
| 2009/0247360 | A1 * | 10/2009 | Ben-Shabat ............ | F01B 9/047 477/115 |
| 2010/0114444 | A1 * | 5/2010 | Verhagen ................ | B60T 7/042 701/70 |
| 2010/0126167 | A1 * | 5/2010 | Nagel .................... | B60T 13/745 60/545 |
| 2012/0031716 | A1 * | 2/2012 | Flodin .................... | F16D 51/18 188/79.63 |

FOREIGN PATENT DOCUMENTS

| | | |
|---|---|---|
| DE | 198 23 568 A1 | 5/1999 |
| DE | 10254127 * | 6/2004 |
| DE | 10 2006 010 483 A1 | 9/2007 |
| DE | 10 2009 027 468 A1 | 1/2011 |
| EP | 2 465 741 A1 | 6/2012 |

| | | | |
|---|---|---|---|
| JP | 60501123 A | | 7/1985 |
| WO | 2011/003643 A1 | | 1/2011 |
| WO | WO-2014077449 | * | 5/2014 |

OTHER PUBLICATIONS

International Search Report corresponding to PCT Application No. PCT/EP2013/062687, mailed Oct. 14, 2013 (German and English language document) (5 pages).

* cited by examiner

*Primary Examiner* — Robert A Siconolfi

*Assistant Examiner* — San Aung

(74) *Attorney, Agent, or Firm* — Maginot, Moore & Beck LLP

(57) ABSTRACT

An electric brake booster includes an electric motor activating a booster piston acting on the master-cylinder during brake pedal activation. The booster piston is driven in the direction of the action of same on the master-cylinder by an electric motor linked to a mechanical transmission that includes a screw held by the motor shaft. The screw meshes with two symmetrical worm gears that are integral with respective transmission shafts housed in a bearing of the body of the brake booster. The two shafts each carry a spur gear that meshes with a rack of the booster piston. The shafts are free in translation relative to the screw and to the body of the electric brake booster but are integral with each other in the translational movement of same. The shafts are integrally connected in translation by a coupling member formed by a crosspiece carrying two rotation bearings.

8 Claims, 4 Drawing Sheets

ELECTRIC BRAKE BOOSTER WITH TRANSMISSION CLEARANCE COMPENSATION

This application is a 35 U.S.C. §371 National Stage Application of PCT/EP2013/062687, filed on Jun. 19, 2013, which claims the benefit of priority to Serial No. FR 1256008, filed on Jun. 25, 2012 in France, the disclosures of which are incorporated herein by reference in their entirety.

BACKGROUND

The present disclosure relates to an electric brake booster comprising an electric motor activating a booster piston acting on the master-cylinder when the brake pedal is activated, the booster piston being driven in the direction of the action of same on the master-cylinder by an electric motor linked to a mechanical transmission comprising a screw carried by the shaft of the motor and meshing with two symmetrical worm gears, each integral with a transmission shaft carrying a spur gear meshing with a rack of the booster piston, each shaft being housed in a bearing of the body of the brake booster.

Electric brake boosters of the type defined above are known. In these brake boosters, since the booster piston is driven symmetrically, balanced by two symmetrical transmissions relative to the plane passing through the axis of the booster piston and the drive screw, but since mechanically it is impossible to have perfect symmetry, in order to balance the drive by the two symmetrical transmissions, a clearance is left for the booster piston, that is to say for the racks, such that the booster piston can be positioned with the racks thereof so that the spur gears meshing therewith engage with the two racks in a balanced manner. However, the clearance that must be left for the booster piston is not suitable for the desirable accuracy of the operation of the brake booster or for the reliability thereof.

The object of the present disclosure is to perfect the guidance and the drive of the booster piston by the transmission linking the electric drive motor to the booster piston, and in particular to make it possible to reduce the clearance of the booster piston in the guiding seat thereof in the brake booster.

SUMMARY

To this end, the disclosure relates to an electric brake booster of the type defined above, characterized in that the shafts are free in translation relative to the screw and to the body of the electric brake booster but are integrally interconnected in the translational movement thereof.

The freedom provided to the two shafts carrying the worm gears meshing with the screw carried by the output shaft of the drive motor makes it possible to naturally balance the engagement clearance of the racks, the spur gears meshing with the racks being able to move in translation along the geometric axis thereof relative to the racks. Since the angle of the teeth of the two worm gears in the symmetrical positions, in the region of contact thereof with the screw, have slopes inclined in opposite directions relative to the plane of symmetry passing through the axis of the screw and the axis of the booster piston, a balancing position making it possible to engage the two racks with the same force or the same torque is necessarily reached.

This balancing movement corresponds to a translation of the two shafts with the worm screws so as to move up or down slightly relative to the median plane passing through the geometric axis of the screw.

Consequently, this natural balancing of the two symmetrical transmissions does not require any specific clearance of the booster piston or the racks, which makes it possible to perform the machining with a good level of accuracy, ensuring smooth functioning, silent functioning and reliability. The machining is preferably performed in accordance with a sliding adjustment.

In accordance with a further advantageous feature, the shafts are integrally connected in translation by a coupling member formed by a crosspiece carrying two rotary bearings each locked on a shaft and cooperating with an axial guide parallel to the geometric axis of the two transmission shafts. This embodiment of the coupling member integrally connecting the two shafts in translation has the advantage of simultaneously contributing to the guidance of the two shafts.

In accordance with an advantageous feature, the coupling member is formed of a crosspiece terminated by two loops each receiving the outer ring of one of the rotary bearings. This embodiment is particularly simple and facilitates the mounting of the mobile equipment, since it is sufficient to clip the rotary bearings into the loops, in particular if the loops are open loops. These loops simultaneously ensure the sliding of this part of the mobile equipment in the guide seat of the body of the brake booster.

This coupling member is preferably made of a plastics material.

In accordance with a further advantageous feature, each transmission shaft is equipped with a rotary bearing on either side of the spur gear meshing with the rack thereof.

In accordance with a further advantageous feature, the low bearing at the end of the transmission shaft on the side opposite that carrying the worm screw is a needle roller bearing and the high bearing between the spur gear and the worm screw is a ball bearing.

As already discussed above, the axial sliding of the coupling member is produced by an axial seat receiving on the one hand each rotary bearing of each shaft directly connected to the coupling member and also an axial seat receiving the other rotary bearing of each shaft.

The rotary bearings associated with the coupling member are advantageously ball bearings.

In accordance with a further advantageous feature, the two shafts are integrally connected in translation along the axis thereof by a coupling member formed by a first disk integral with one shaft and a double disk integral with the other shaft and overlapping the edge of the aforesaid disk, the guidance in translation of the shafts being produced by cylindrical seats receiving the rotary bearings carried by each shaft.

BRIEF DESCRIPTION OF THE DRAWINGS

The present disclosure will be described hereinafter in greater detail with the aid of exemplary embodiments of an electric brake booster shown schematically in the accompanying drawings, limited to those parts forming the subject of the disclosure.

Thus.

DETAILED DESCRIPTION

Figure 1:
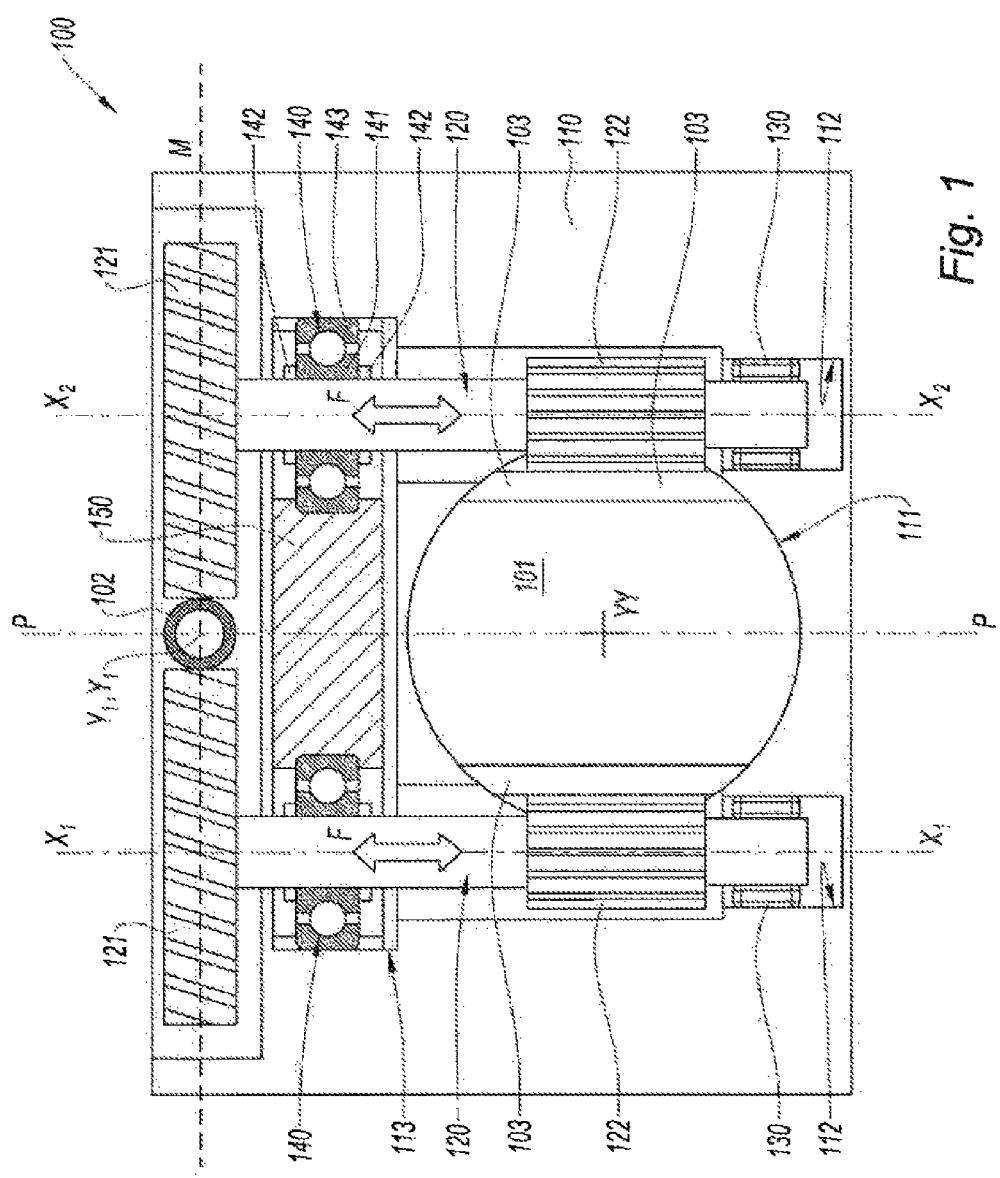
FIG. 1 is a schematic sectional view perpendicular to the axis of the screw of the transmission of the electric brake booster between the worm screw of the electric motor and the racks of the booster piston.

According to FIG. 1, the disclosure relates to an electric brake booster 100 acting by means of a booster piston 101 on the master-cylinder of the brake system. Neither the master-cylinder nor the brake system downstream of the master-cylinder with the brake wheels is shown. The figure is limited to a very schematic sectional view of the electric brake booster 100 perpendicular to the axis of the booster piston 101 at the transmission driving the booster piston from the output shaft 102 of the electric motor, which also is not shown.

The electric brake booster 100 is formed of a body 110 housing the booster piston 101 guided in a cylinder 111 along an axis of translation yy perpendicular to the plane of FIG. 1.

The electric motor has an output shaft carrying the screw 102 of geometric axis perpendicular to the plane of FIG. 1. This screw 102 drives two transmission shafts 120, which are symmetrical with respect to the median plane PP passing through the geometric axis of the screw 102 and that of the booster piston 101. The median plane MM perpendicular to the plane of FIG. 1 and passing through the geometric axis y1y1 of the screw 102 constitutes a reference plane used in the following description.

The booster piston 101 comprises two racks 103 arranged symmetrically with respect to the plane PP for the drive of the piston 101 from the screw 102 by means of two symmetrical transmissions each formed by a worm screw 121 meshing with the screw 102 and integral with the transmission shaft 120 carrying a spur gear 122 each meshing with a rack 103. The toothing of the two worm screws 121 is identical. Due to the symmetrical position of the two transmissions with respect to the plane PP and with respect to the screw 102, the rotation of the screw meshing with the worm screws 121 is produced by movements of opposite rotation of the two spur gears 122, which thus drive the booster piston 101 by the racks 103.

The transmission shaft 120 is mounted via the low end thereof in accordance with the orientation of FIG. 1 in a rotary bearing 130 formed by a needle roller bearing sliding in a cylindrical seat 112 of axis (x1x1) (x2x2) coaxial with that of the transmission shaft 120. The transmission shaft 120 is carried between the worm screw 121 and the spur gear 122 by a rotary bearing 140 formed by a ball bearing of which the inner ring 141 is fixed against translation on the shaft 120, for example by two stop rings 142, and of which the outer ring 143 is housed in a coupling member 150 connecting the rotary bearings 140 of the two transmission shafts 120 in order to integrally connect the two transmission shafts in the translational movement thereof (double-headed arrow F) along the axes (x1x1) and (x2x2), which are parallel as will be described. The coupling member 150 is guided in a seat 113 of the body 110 for the movement in translation thereof in the direction (x1x1/x2x2).

The coupling member 150 of FIG. 1, shown very schematically and generally, ensures the two functions by the same part, specifically the integral connection in translation of the transmission shafts 120 and the guidance of the shafts 120 in the direction (x1x1/x2x2).

FIGS. 2A-3B show an embodiment of this coupling member 150, which is formed by a crosspiece 151 terminated at the two ends thereof by a loop 152, in particular an open loop with which the outer ring 143 of each of the two rotary bearings 140 formed by ball bearings is engaged. These bearings 140 are fixed by the inner ring 141 thereof, integrally in translation on each of the two shafts 120.

Figure 2A:
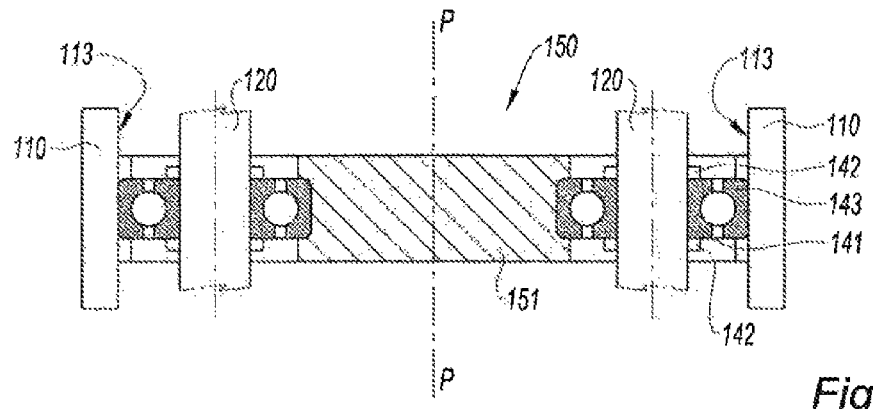
FIG. 2A shows a sectional view of the member connecting the two shafts in translation.
Figure 2B:
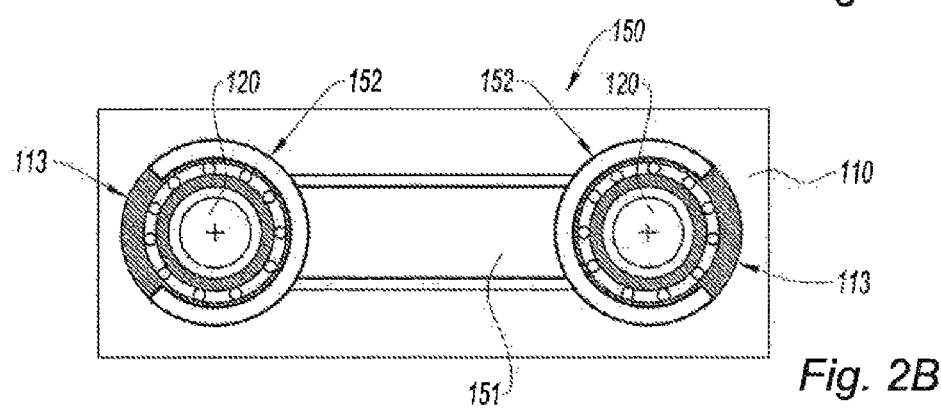
FIG. 2B is a plan view of FIG. 2A.

The loops 152 of the coupling member 150 are guided in translation in the direction perpendicular to the plane of FIG. 2B in the cylindrical seats 113 formed in the body 110 of the electric brake booster 100.

Figure 3A:
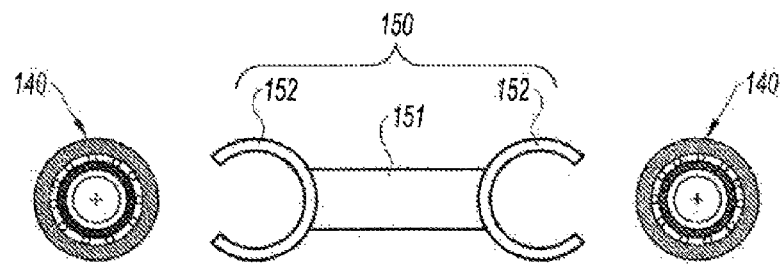
FIG. 3A shows an embodiment of the coupling member with the two rotary bearings in the form of roller bearings in a position of engagement with the coupling member.
Figure 3B:
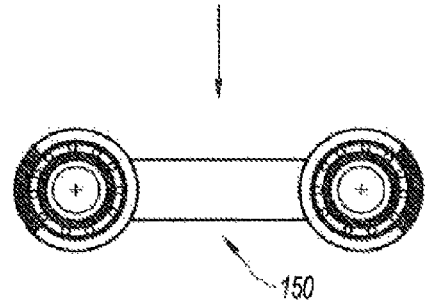
FIG. 3B shows the coupling member mounted on the two rotary bearings, FIG. 4 schematically shows a first position of balance of the two symmetrical lowered transmissions, relative to the nominal median plane.

FIGS. 3A-3B show the detail of this embodiment of the coupling member 150 with the crosspiece 151 thereof terminated by the two open loops 152, which can receive the two ball bearings 140 by clipping. The terminated structure is shown in FIG. 3B in plan view.

Figure 4:
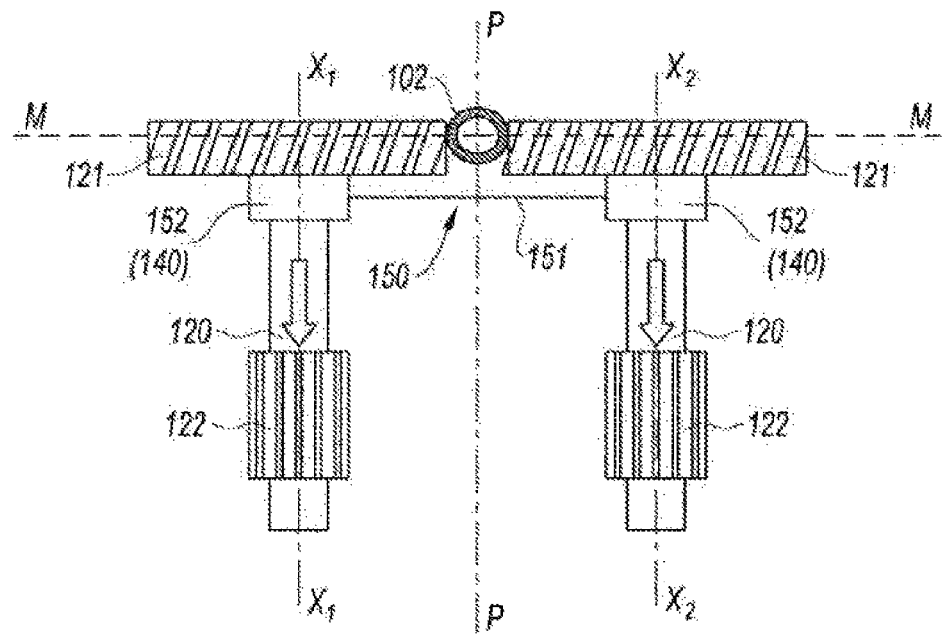
Figure 5:
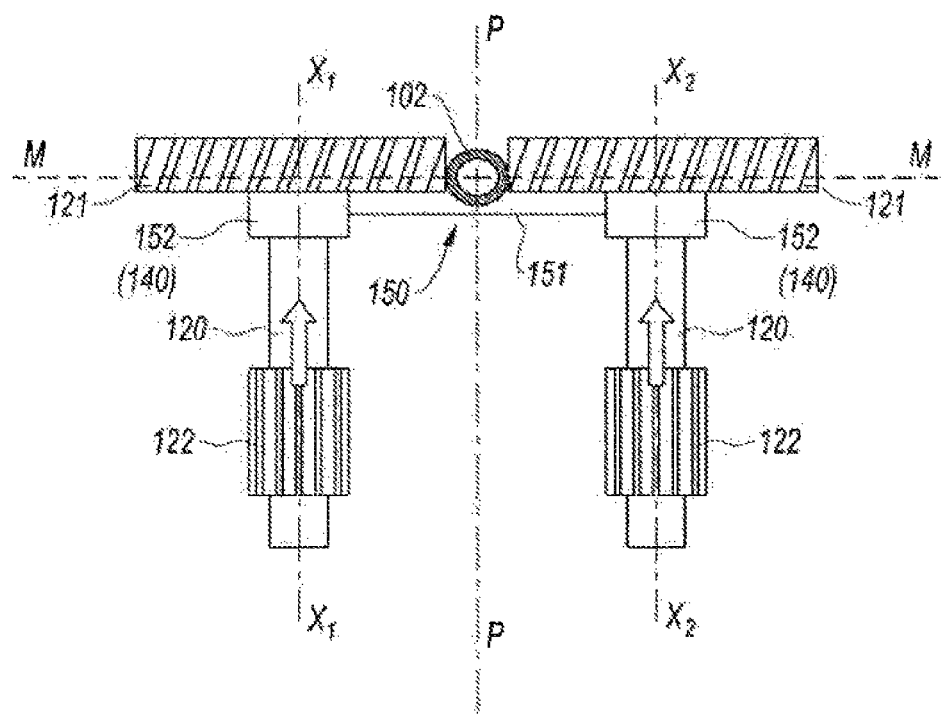
FIG. 5 shows the reverse position of balance by lifting of the two symmetrical transmissions relative to the median plane.

FIGS. 4 and 5 very schematically show the two positions of balance or of clearance compensation produced by the electric booster brake 100 according to the disclosure due to the freedom of translation of the two transmission shafts 120 nevertheless integral in translation by the coupling member 150 and the two rotary bearings 140. FIG. 4 shows the case in which the clearances between the spur gears 122 and the two racks 103 are produced by a downward displacement of the equipment movable in translation formed by the two transmission shafts 120, the spur gears 122 and the worm screws 121 relative to the median plane MM passing through the screw 102. FIG. 5 shows an opposite position resulting from the compensation lifting of the mobile equipment 120, 121, 122, 150 relative to the median plane MM passing through the axis of the screw 102.

Figure 6:
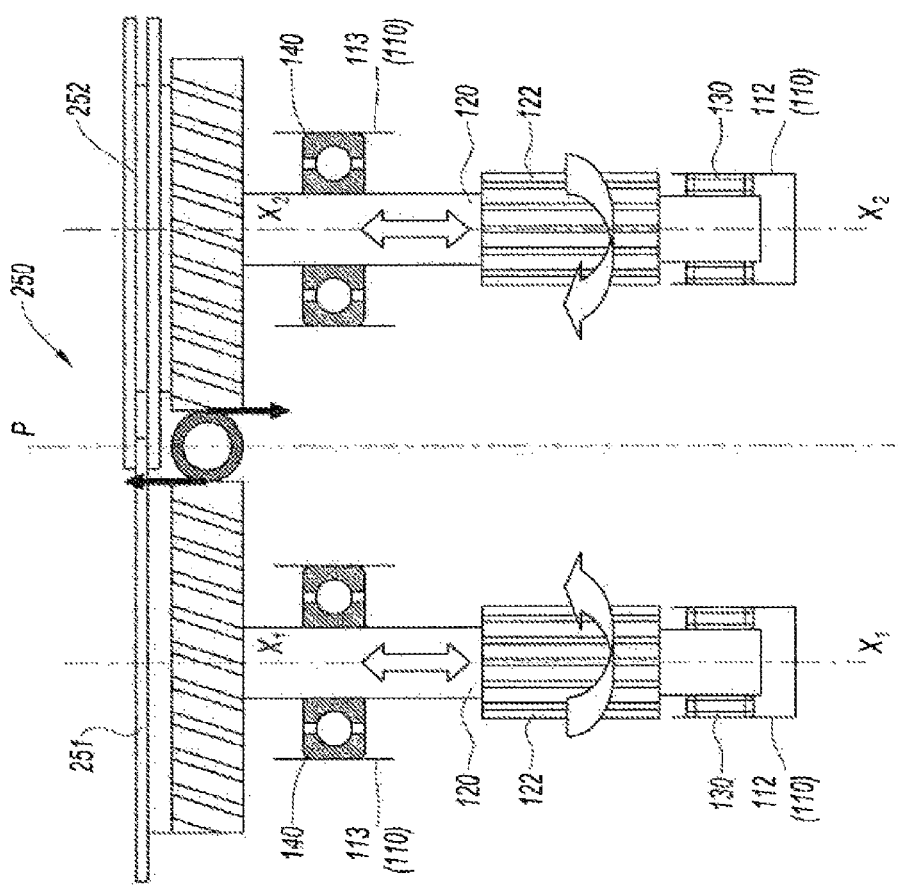
FIG. 6 is a sectional view similar to that of FIG. 1, showing another member coupling the two symmetrical shafts in translation.

FIG. 6 shows a second embodiment of a coupling member 250 of the two transmission shafts 120. In accordance with this variant, the coupling member 250 ensures the coupling in translation without ensuring the guidance in translation of the two transmission shafts 120. The guidance in translation is ensured in this case by the two roller bearings 130, 140, in particular the needle roller bearing 130 at the low end of the transmission shaft 120 and the ball bearing 140 between the spur gear 122 and the worm screw 121 of each of the two shafts 120. The cylindrical wells or seats 112, 113 of circular section each receiving two rotary bearings 130, 140 of each transmission shaft 120 are shown by single lines; these guide seats 112, 113 are formed in the body 110 of the brake booster 100.

The coupling member 250 according to this variant is formed by a circular crown or a disk 251 carried by the first transmission shaft 120 (x1x1) and by a double crown 252 overlapping the edge of the disk 251 of the first transmission shaft 120 so as to allow the free rotation, but integrally connected movement in translation of the two shafts 120.

LIST OF REFERENCE SIGNS 100 electric brake booster
101 booster piston
102 screw
103 rack
110 body of the brake booster
111 guide cylinder of the booster piston
112 guide seat
113 guide seat
120 transmission shaft
121 worm screw 122 spur gear
130 rotary bearing/needle roller bearing
140 rotary bearing/ball bearing
141 inner ring
142 stop ring
143 outer ring
150 coupling member
151 crosspiece
152 loop/double crown
250 coupling member
251 circular crown/disk
x1x1, x2x2 geometric axis of transmission shafts 120
yy axis of the booster piston 101
y1y1 axis of the screw 102
PP plane of symmetry of the brake booster
MM median plane

The invention claimed is:

1. An electric brake booster including an electric motor activating a booster piston acting on the master-cylinder when the brake pedal is activated, the booster piston being driven in the direction of the action of same on the master-cylinder by the electric motor linked to a mechanical transmission, the mechanical transmission comprising:
   two transmission shafts housed in respective bearings of a body of the brake booster, the transmission shafts each being integral with a symmetrical worm gear and carrying a spur gear that meshes with a rack of the booster piston; and
   a screw carried by a shaft of the electric motor, the screw meshing with the two symmetrical worm gears,
   wherein the transmission shafts are free in translation relative to the screw and to the body of the electric brake booster but are integrally interconnected in the translational movement of same.

2. The electric brake booster as claimed in claim 1, wherein the transmission shafts are integrally connected in translation by a coupling member formed by a crosspiece carrying two rotary bearings each locked on a respective shaft and cooperating with an axial guide parallel to the geometric axis of the two transmission shafts.

3. The electric brake booster as claimed in claim 2, wherein the coupling member is formed of a crosspiece terminated by two loops each receiving an outer ring of one of the rotary bearings.

4. The electric brake booster as claimed in claim 1, wherein each transmission shaft is equipped with a rotary bearing on either side of the spur gear meshing with the rack thereof.

5. The electric brake booster as claimed in claim 4, wherein the low bearing at the end of the transmission shaft on the side opposite that carrying the worm screw is a needle roller bearing and the high bearing between the spur gear and the worm screw is a ball bearing.

6. The electric brake booster as claimed in claim 2, wherein the axial sliding of the coupling member is produced by an axial seat receiving each rotary bearing.

7. The electric brake booster as claimed in claim 2, wherein the rotary bearings are ball bearings.

8. The electric brake booster as claimed in claim 1, wherein the two transmission shafts are integrally connected in translation along the axis thereof by a coupling member formed by a first disk integral with one shaft and a double disk integral with the other shaft and overlapping the edge of the first disk, the guidance in translation of the transmission shafts being produced by cylindrical seats receiving the rotary bearings carried by each shaft.

\* \* \* \* \*